United States Patent Office 3,803,184
Patented Apr. 9, 1974

3,803,184
METHOD FOR PREPARING DESMOSTEROL
M. Thomas Njimi and George Charles, Cameroun, France, assignors to The State of Cameroun, Yaounde, United Republic of Cameroun
No Drawing. Filed Aug. 3, 1972, Ser. No. 277,841
Claims priority, application Malagasy, Aug. 3, 1971, 54,321; Feb. 3, 1972, 54,483, 54,484
Int. Cl. C07c 167/38, 167/42
U.S. Cl. 260—397.25                    17 Claims

ABSTRACT OF THE DISCLOSURE

A process for obtaining 25-hydroxy-cholesterol or a derivative of desmosterol with other phytosterols which comprises converting the desmosterol to 25-hydroxy-cholesterol and recovering the 25-hydroxyl-cholesterol from the mixture.

---

The present invention relates to a method for the recovery of desmosterol ($C_{27}H_{44}O$) and derivatives thereof from vegetable products.

Desmosterol plays an important role, as a labile intermediate, in the biosynthesis of cholesterol in animals, (W. M. Stokes, W. A. Fish and F. C. Hickel, J. Biol. Chem. 1956, 220, 415; W. M. Stokes et coll. ibid. 1958, 232, 347; J. Avigan and coll. J. Biol. Chem. 1960, 235, 3123). These authors have isolated minimal amounts of desmosterol from the embyro of chickens, the skin of rats, from serum, from the liver and other animal tissues.

Desmosterol has also been isolated from certain marine molluscs (Fagarlund and Idler, J. Amer. Chem. Soc. 1957, 79, 6473) and more recently from red algae (Gibbons, Goad and Goodwin, Phytochemistry, 1967, 6, 677; D. R, Idler, A Saito and P. Wiseman, Steroids, 1968, 11, 465).

Desmosterol has been partially synthesized (Fagerlund and Idler, loc. cit.; Bermann and Dusza, J. Org. Chem. 1958, 23, 459) but the product remains very expensive due to the lack of large quantities of a relatively cheap starting material.

Apart from its intrinsic interest, desmosterol may be considered as an interesting starting material for the partial synthesis of certain Physiologically active steroids some of which have become very important in recent years (e.g. hormones of the ecdysone type; hydroxy-25 vitamin $D_3$ or 25 H.C.C.).

Unlike cholesterol, the normal starting material for synthesizing certain steroids (for example vitamin $D_3$), desmosterol already contains a reactive side chain ($\Delta^{24}$). Thus, for example, considering hydroxy-25 vitamin $D_3$ or 25 H.C.C., a biologically active form of vitamin $D_3$ whose antirachitic action is the most powerful of currently available materials (J. A. Campbell, D. M. Squires and J. C. Babcock, Steroids, 1969, 13, 567), it is difficult to envisage the synthesis of this material starting from cholesterol. On the other hand desmosterol appears to be a choice starting material. The synthesis of $\Delta^7$-desmosterol is known (T. J. Scallen, Research Communications, 1965, 21, 89) and the subsequent reactions are likewise known in the $\Delta^7$-cholesterol and ergosterol series.

It is an object of this invention to provide a process for the recovery of desmosterol from natural products containing, especially a mixture of phytosterols containing it.

It has now been found, in accordance with the present invention, that desmosterol may be recovered from a mixture thereof with other phytosterols by converting the desmosterol to 25-hydroxy-cholesterol, recovering the 25-hydroxy-cholesterol from the mixture and subsequently dehydrating the 25-hydroxy-cholesterol to convert it to desmosterol. A raw vegetable material from which a mixture of phytosterols containing desmosterol may conveniently be obtained is one which is a plant or a part of a plant of the family Phanerogamae, particularly a plant of the tribe Apocyanaceates, for example a plant of the species Funtumia or Holarrhena. In the following description reference will be made particularly to the use of *Funtumia elastica* seeds as the raw vegetable material although similar results have been obtained with other parts of the plant.

The present invention also makes it possible to recover 25-hydroxy-cholesterol from a mixture of phytosterols containing desmosterol as well as other derivatives, e.g. the acetate. Desmosterol, even when stored in the dark, deteriorates after some months (M. J. Thompson, J. N. Kaplanis and H. E. Vroma, Steroids, 1965, 551). On the other hand 25-hydroxy-cholesterol and its derivatives are starting materials used in the synthesis of 25 H.C.C. (J. W. Blunt & H. F. De Luca, Biochemistry 1969, 8, 671–675), but 25-hydroxy-cholesterol is very expensive. Accordingly 25-hydroxy-cholesterol is in itself an interesting product.

Accordingly, the invention provides a process for obtaining 25-hydroxy-cholesterol or a derivative thereof from a mixture of phytosterols containing desmosterol which comprises converting the desmosterol to 25-hydroxy-cholesterol and subsequently recovering the 25-hydroxy-cholesterol from the mixture. The recovered 25-hydroxy-cholesetrol may subsequently be dehydrated to convert it to desmosterol so as to afford a process for the recovery of the desmosterol from the mixture thereof with other phytosterols.

The conversion of the desmosterol to 25-hydroxy-cholesterol is conveniently effected by treating the mixture of phytosterols with mercuric acetate and subsequently with a reducing agent such as an alkali metal borohydride. The 25-hydroxy-cholesterol obtained in the mixture may then be recovered from the mixture by chromatography, especially over a silica column, or by fractional crystallization, for example alternate fractional crystallization from benzene and methanol. In a modification of the process the mixture of phytosterols containing desmosterol is first acetylated, the acetylated mixture is chromatographed over an alumina column impregnated with silver nitrate to produce a desmosterol acetate-rich fraction, the desmosterol acetate in said fraction is converted to 25-hydroxy-cholesterol acetate and this latter recovered from the mixture, suitably by chromatography over a silica column.

As stated above the 25-hydroxy-cholesterol may be dehydrated, e.g. by the action of concentrated sulphuric acid, to convert it to desmosterol. Similarly, the 25-hydroxy-cholesterol acetate may be dehydrated to desmosterol acetate which latter compound may be saponified to yield desmosterol itself.

Preferably, as stated above, the mixture of phytosterols containing desmosterol is one obtained from vegetable material from a plant of the family Phaerogamae. The mixture is conveniently obtained from the vegetable material by extracting it with an organic solvent, saponifying the material extracted with the solvent and isolating the unsaponifiable material containing the mixture of phytosterols, conveniently by acidifying the saponified material, extracting the acidified material with an organic solvent such as diethyl ether, drying the organic solvent extract and removing the solvent therefrom. The isolated unsaponifiable material may be further purified by chromatographing it over an alumina column to separate out the said mixture of phytosterols.

The preferred modes of operating the process according to the invention will now be described in more detail, using seeds of *Funtumia elastica* as starting material.

*Funtumia elastica* seeds are collected, preferably when perfectly ripe or matured, dried, ground and extracted under neutral conditions with an organic solvent, preferably petroleum ether, to produce an organic solvent extract from which an oily material is recovered by removal of the solvent. The oily material is then saponified by soda or potash. The saponified mixture is then diluted, with stirring, with distilled water and the diluted mixture is acidified to approximately pH 8 with an inorganic acid such as hydrochloric acid, nitric acid or sulphuric acid. The acidified mixture is poured into a separating funnel containing an organic solvent such as diethyl ether, petroleum ether or hexane. The mixture in the funnel is then allowed to stand to allow the aqueous and organic phases to separate. The organic layer is separated off and the aqueous layer extracted a further three times with fresh organic solvent.

The combined organic solvent extracts are washed with distilled water and then dried over anhydrous sodium sulphate. The organic solution is then filtered and the solvent evaporated off from the filtrate in a rotating evaporator. The residue consists of the unsaponifiable material in the original extract and comprises cycloartenol, 31-norlanosterol, 24-dehydro-lophenol and other phytosterols.

Alternatively, the saponified mixture can be extracted on a continuous basis, after acidification, in a liquid-liquid extraction apparatus with ascending flow using, for example, diethyl ether, petroleum ether or hexane or organic extractant.

The unsaponifiable material is then chromatographed over alumina using, for example, petroleum ether or diethyl ether or a mixture thereof as eluant. The cycloartenol, the 24-dehydro-lophenol and the 31-nor-lanosterol mixture separate first followed by the mixture of phytosterols containing mainly desmosterol. It is this latter material which is subsequently treated in accordance with the invention and three main types of processes (all involving conversion of the desmosterol to 25-hydroxy-cholesterol) may be employed, as described below.

VARIANT A

The mixture of phytosterols is then acetylated, for example using acetic anhydride as acetylating agent, and resultant acetates are chromatographed on a silica column impregnated with silver nitrate (for example using benzene, a benzene/ethyl acetate mixture, petroleum ether or a petroleum ether diethyl ether mixture as eluent) to separate the components into two categories, namely the components having one double bond (which are eluted first) and the components having two double bonds, including desmosterol in the form of its acetate (which are eluted next). This latter category of components already contains a very high proportion of desmosterol in the form of its acetate. (The preliminary separation, which may be time-consuming and expensive may be dispensed as described in Variant B below.)

The resultant mixture of acetates in solution in, preferably, tetrahydrofurane is then treated with mercuric acetate and the reaction mixture is then reduced, preferably using sodium borohydride as reducing agent. The organic products are separated to give a mixture which is then chromatographed on an adsorbent (silica or other) column using, for example, benzene or a benzene/ethyl acetate mixture. (Alternatively, the products may be separated by fractional crystallization as described in Variant C below.)

The products which have not reacted are eluted and 25-hydroxy-cholesterol is then obtained as its monoacetate which may be saponified to give 25-hydroxy-cholesterol.

The desmosterol is obtained in the form of its acetate by dehydrating the hydroxy-25-cholesterol monoacetate, e.g. with phosphorus oxychloride, and may be purified by recrystallization from acetone.

The saponification of the desmosterol acetate, e.g. with alcoholic KOH, gives desmosterol.

VARIANT B

The phystosterol mixture is subjected directly to treatment to convert the desmosterol to 25-hydroxy-cholesterol.

The phytosterol mixture is dissolved in tetrahydrofuran, the solution which is obtained is stirred, and then a slight excess of mercuric acetate is added. The progress of the reaction is ascertained by periodic chromatography on a thin silica layer. When the reaction is complete the reaction mixture is reduced with sodium borohydride and the organic layer is separated off, dried and evaporated. The residue is dissolved in benzene and chromatographed on an adsorbent (silica or other) column, using benzene or a benzene/ethyl acetate mixture as eluant. The hydroxy-25 cholesterol is eluted last and is then dehydrated, e.g. using concentrated phosphoric acid or phosphorus oxychloride in pyridine to give desmosterol.

VARIANT C

In this process the silica column chromatography is omitted and replaced by fractional crystallization.

The reaction mixture resulting from the treatment of the mixture of phytosterols with mercuric acetate in tetrahydrofuran followed by reduction with sodium borohydride, after extraction and evaporation of the solvent, is completely dissolved in hot, e.g. refluxing benzene. The solution is then allowed to cool to ambient temperature. The 25-hydroxy-cholesterol crystallizes out and is filtered off. The benzene mother liquors are evaporated under reduced pressure and the residue is dissolved in hot, e.g. boiling methyl alcohol. On cooling the phytosterols which have not reacted crystallize out are filtered out. The methyl alcohol mother liquors are evaporated under reduced pressure and the residue is dissolved in hot benzene. Upon cooling, a further amount of 25-hydroxy-cholesterol crystallizes out and is filtered off. These operations are generally sufficient to separate out nearly all of the 25-hydroxy-cholesterol from the reaction mixture. If desired, the mother liquors may be chromatographed as described in Variants A or B in order to recover the remainder of the 25-hydroxy-cholesterol.

Dehydration of the 25-hydroxy-cholesterol leads to desmosterol.

In order that the invention may be well understood the following examples are given by way of illustration only.

EXAMPLE 1

(a) 4 kg. of dried seeds of *Funtumia elastica* are finely ground and extracted under neutral conditions in a Sohxlet extractor with petroleum ether (60–80) for 24 hours. The ether is evaporated off from the resultant ethereal extract under reduced pressure to give 1 kg. of an oily residue. The oily residue is then saponified with 6 N alcoholic potassium hydroxide or sodium hydroxide and the saponified mixture is diluted with 5 times its volume of distilled water after which the diluted mixture is acidified to pH 8 with 20% hydrochloric acid. The acidified mixture is introduced into a separating funnel and extracted four times with diethyl ether. The ethereal extracts are combined, washed with water, dried over anhydrous sodium sulphate and evaporated to dryness to give 40 g. of unsaponifiable material.

The unsaponifiable material is chromatographed to 1.2 kg. of neutral alumina (activity III) to give 30 g. of triterpenic and methylsterol compounds (eluted with a petroleum ether/diethyl ether mixture) and 10 g. of sterols, containing desmosterol (eluted with diethyl ether).

(b) (Variant A): The 10 g. of sterols obtained in (a) above are dissolved in 50 cc. of anhydrous pyridine and there are then added to the solution, with cooling, 50 cc.

of acetic anhydride. The reaction mixture is allowed to stand for 15 hours at ambient temperature and is then poured onto crushed ice. The whole mixture is stirred and then extracted three times with diethyl ether. The combined ethereal extracts are acidified to pH 5 by washing with hydrochloric acid and then neutralized by washing with 10% sodium carbonate solution. The neutralized extract is then washed with water, dried over anhydrous sodium sulphate and evaporated to dryness to give a mixture of 11.5 g. of sterol acetates which mixture is then chromatograhed over a column of silica impregnated with 25% of silver nitrate. This chromatography separates the mixture into 2.5 grams of compounds containing one double bond (eluted with petroleum ether or benzene) and 9 grams of compounds containing two double bonds (eluted with a petroleum ether/diethyl ether or benzene/ethyl acetate mixture). The product containing the compounds having two double bonds contains 66% of desmosterol acetate and after three recrystallizations from acetone yields 4 grams of 90% pure desmosterol acetate.

In order to obtain a product of greater purity the 9 grams of compounds containing two double bonds are treated with mercuric acetate followed by reduction with sodium borohydride as described in more detail in Example 2 below to give 9.3 grams of acetates which on chromatography yield 4.5 grams of very pure 5-hydroxy-cholesterol which is converted by dehydration with phosphorus oxychloride followed by saponification with alcoholic potassium hydroxide to desmosterol.

EXAMPLE 2—VARIANT B (a) 10 grams of a sterol mixture, obtained as described in Example 1(a) are dissolved in tetrahydrofuran and 8 grams of mercuric acetate are dissolved in water. The solutions are mixed together and stirred magnetically. After 6 hours thin layer chromatography indicates that the reaction is almost complete and a 0.5 M solution of sodium borohydride in 3 M sodium hydroxide solution is added to the reaction mixture. The organic phase is then separated from the reaction mixture, washed, dried over anhydrous sodium sulphate and evaporated to dryness to give 9.2 grams of a residue.

(b) The residue from (a) above is dissolved in benzene and chromatographed over a silica column. Elution with benzene and a benzene/ethyl acetate mixture yields, respectively, 3.2 grams of a mixture of sterols which did not react with the mercuric acetate and 4.5 grams of highly pure 25-hydroxy-cholesterol which is subsequently dehydrated to desmosterol by the action of sulphuric acid in dioxan.

EXAMPLE 3—VARIANT C 9.2 grams of a residue obtained as described in Example 2(a) are dissolved in hot (boiling) benzene. The solution is allowed to cool to room temperature and 25-hydroxy-cholesterol crystallizes out. The 25-hydroxy-cholesterol is filtered off and the mother liquors are concentrated and the whole operation repeated. A total of 4 grams of very pure 25-hydroxy-cholesterol is obtained.

The mother liquors from the second crystallization are evaporated to dryness and the residue dissolved in hot methanol from which, on cooling, there are crystallized out the sterols which did not react with the mercuric acetate.

Chromatography of the mother liquors over a silica column yields 0.5 gram of 25-hydroxy-cholesterol and 0.5 gram of other sterols.

What we claim is:

1. A process for obtaining 25-hydroxy-cholesterol or the acetate derivative thereof from a mixture of desmosterol with other phytosterols which comprises converting the desmosterol to 25-hydroxy-cholesterol by treatment with an inorganic acetate and subsequently with reducing agent and recovering the 25-hydroxy-cholesterol from the mixture.

2. A process as claimed in claim 1 in which the desmosterol is converted to 25-hydroxy-cholesterol by treating the mixture of phytosterols containing the desmosterol with an inorganic acetate and subsequently with a reducing agent.

3. A process as claimed in claim 2, in which the reducing agent is an alkali metal borohydride.

4. A process as claimed in claim 1 in which the 25-hydroxy-cholesterol is recovered by chromatography.

5. A process as claimed in claim 4, in which the 25-hydroxy-cholesterol is recovered by chromatography over a silica column.

6. A modification of the process as claimed in claim 4 in which the mixture of phytosterols containing the desmosterol is first acetylated, the acetylated mixture is chromatographed over an alumina/silver nitrate column, to produce a desmosterol acetate-rich fraction, the desmosterol acetate in said fraction is converted to 25-hydroxy-cholesterol acetate and the 25-hydroxy-cholesterol acetate is recovered from the mixture.

7. A process as claimed in claim 1 in which the 25-hydroxy-cholesterol is recovered by fractional crystallization.

8. A process as claimed in claim 7 in which the 25-hydroxy-cholesterol is recovered by fractional recrystallization from benzene.

9. A process as claimed in claim 1 in which the 25-hydroxy-cholesterol or derivative thereof is subsequently dehydrated to convert it to desmosterol.

10. A process as claimed in claim 9 in which the 25-hydroxy-cholesterol is dehydrated to desmosterol by the action of concentrated sulphuric acid or phosphorus oxychloride.

11. A process as claimed in claim 1 in which the mixture of phytosterols is one obtained from vegetable material from a plant of the family of Phaerogamae.

12. A process as claimed in claim 11, in which the plant is of the tribe Apocynaceates.

13. A process of claim in claim 12, in which the plant is of the species Funtumia or Holarrhena.

14. A process as claimed in claim 13, in which the vegetable material comprises the seeds of *Funtumia elastica*.

15. A process as claimed in claim 11 in which the mixture of phytosterols is obtained by extracting the vegetable material with an organic solvent, saponifying the material extracted with the solvent and isolating the unsaponifiable material containing the mixture of phytosterols.

16. A process as claimed in claim 15, in which the unsaponifiable material is isolated by acidifying the saponified material, extracting the acidified material with an organic solvent, drying the solvent extract and removing the solvent therefrom.

17. A process as claimed in claim 15 in which the isolated unsaponifiable material is chromatographed over an alumina column to separate out the said mixture of phytosterols.

References Cited

UNITED STATES PATENTS 3,702,810    11/1972    De Luca et al. _____ 204—158

ELBERT L. ROBERTS, Primary Examiner